United States Patent
Hamlin et al.

(10) Patent No.: US 11,593,297 B2
(45) Date of Patent: Feb. 28, 2023

(54) SYSTEM AND METHOD FOR SUPPORTING A DUAL ROLE CONTROLLER IN A PORTABLE INFORMATION HANDLING SYSTEM

(71) Applicant: Dell Products L.P., Round Rock, TX (US)

(72) Inventors: Daniel L. Hamlin, Round Rock, TX (US); Gokul T. Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 17/078,299

(22) Filed: Oct. 23, 2020

(65) Prior Publication Data
US 2022/0131949 A1  Apr. 28, 2022

(51) Int. Cl.
  G06F 9/54 (2006.01)
  G06F 15/177 (2006.01)
  G06F 9/451 (2018.01)

(52) U.S. Cl.
  CPC ............ *G06F 15/177* (2013.01); *G06F 9/452* (2018.02); *G06F 9/54* (2013.01); *G06F 2213/00* (2013.01); *G06F 2213/0042* (2013.01)

(58) Field of Classification Search
  None
  See application file for complete search history.

(56) References Cited

U.S. PATENT DOCUMENTS

| | | | |
|---|---|---|---|
| 2010/0250785 A1* | 9/2010 | Shin ..................... | G06F 3/067 710/3 |
| 2014/0189138 A1* | 7/2014 | Summers ................ | H04L 9/40 709/230 |
| 2015/0134857 A1* | 5/2015 | Hahn ..................... | G06F 3/061 710/5 |

* cited by examiner

*Primary Examiner* — Craig C Dorais
(74) *Attorney, Agent, or Firm* — McDermott Will & Emery LLP

(57) ABSTRACT

A system for supporting a dual role controller in an information handling systems configurable as a device or a host. When the information handling system is connected to another information handling system and configured for operating in a device mode, a proxy service and an agent service execute on the information handling system. Communications from the other information handling system are received by the proxy service and sent to the agent service, which translates generic requests into application specific requests and commands. Device functions like MTP (storage), Webcam (streaming) and generic-USB commands are enabled in device mode for virtual desktop interface (VDI) or hardware isolated applications.

20 Claims, 3 Drawing Sheets

SYSTEM AND METHOD FOR SUPPORTING A DUAL ROLE CONTROLLER IN A PORTABLE INFORMATION HANDLING SYSTEM

BACKGROUND

Field of the Disclosure

This disclosure relates generally to portable information handling systems and, more particularly, to systems for supporting a dual role controller for hardware isolated applications and virtual desktop infrastructure executing on the portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A Universal Serial Bus (USB) dual role controller in a portable information handling system allows the portable information handling system (operating in a device mode) to transfer data via peer-to-peer USB cables to another portable information handling system operating in a host mode. An application running in a portable information handling system monitors communications and triggers the dual role controller to switch between the host mode and the device mode when a cable connection is detected. In the device mode, a portable information handling system may operate under the extensible device controller interface (xDCI) specification. In a host mode, a portable information handling system may operate under the extensible host controller interface (xHCI) specification.

SUMMARY

In many portable information handling systems, applications may be isolated for security and compatibility. These applications may be isolated using hypervisors (Virtual Machine Monitors) with a mini/micro-kernel plus library. For example, applications may be isolated using hypervisor based containers in Windows 10X, WDAG for Edge browsers. To these applications, an application associated with a device (e.g., internal storage or a camera or webcam) on a portable information handling system may be exposed via USB device virtualization, which may be similar to VDI (virtual desktop infrastructure) USB device virtualization.

Embodiments disclosed herein may be generally directed to systems for supporting a dual role controller in a portable information handling system executing a virtual desktop interface (VDI) or hardware isolated applications.

A proxy service executing on a portable information handling system dual role controller monitors communications for dual role controller role change notifications. If the portable information handling system is operating in a host mode and the proxy service intercepts a message requesting the dual role controller change operation to a device mode, the proxy service queries an agent service operating separately on the VDI desktop and hardware isolated application side via a network (internal or external) to determine are any available devices. When the agent service returns a list of available devices, the proxy service exposes these devices to a portable information handling system software stack associated with the dual role controller operating in device mode.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Figure 1:
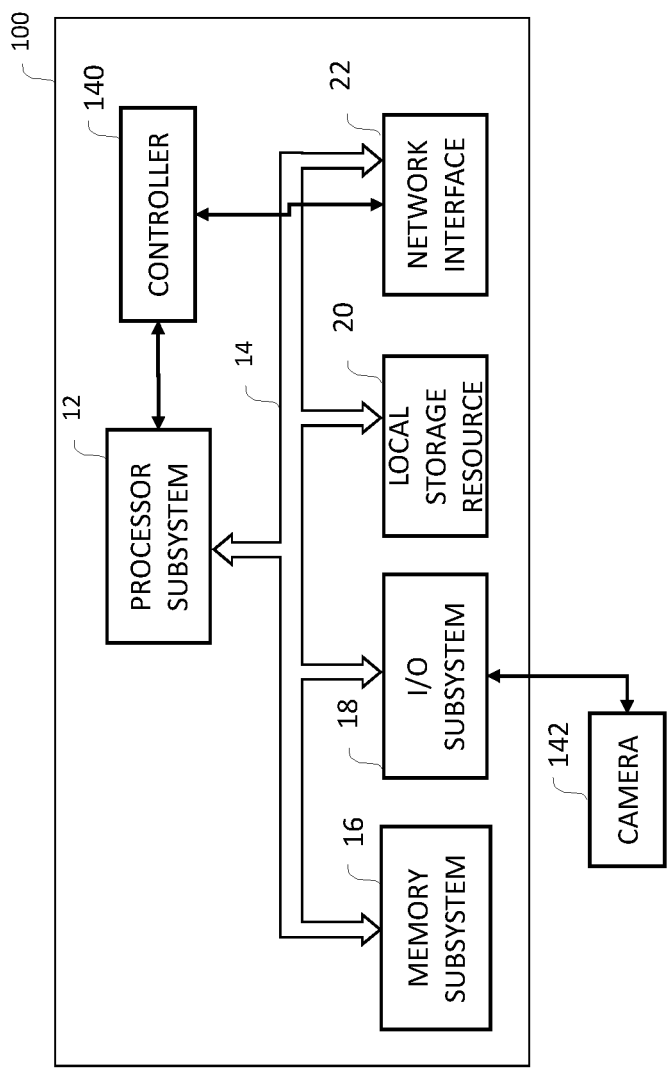
FIG. 1 is a block diagram of selected elements of an embodiment of an information handling system.
Figure 2:
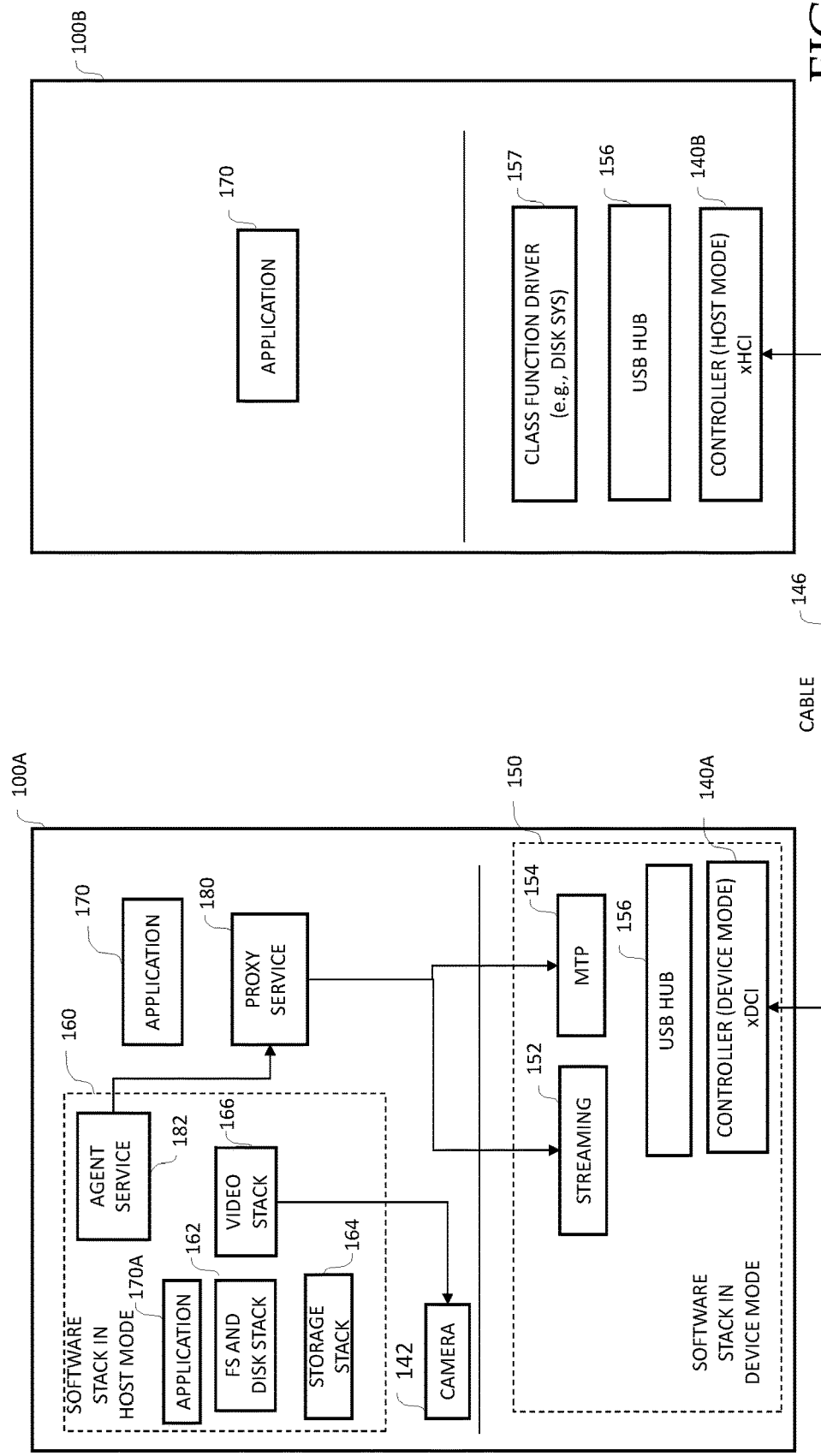
FIG. 2 is a system architecture block diagram of one embodiment of a system for supporting dual role USB controllers.
Figure 3:
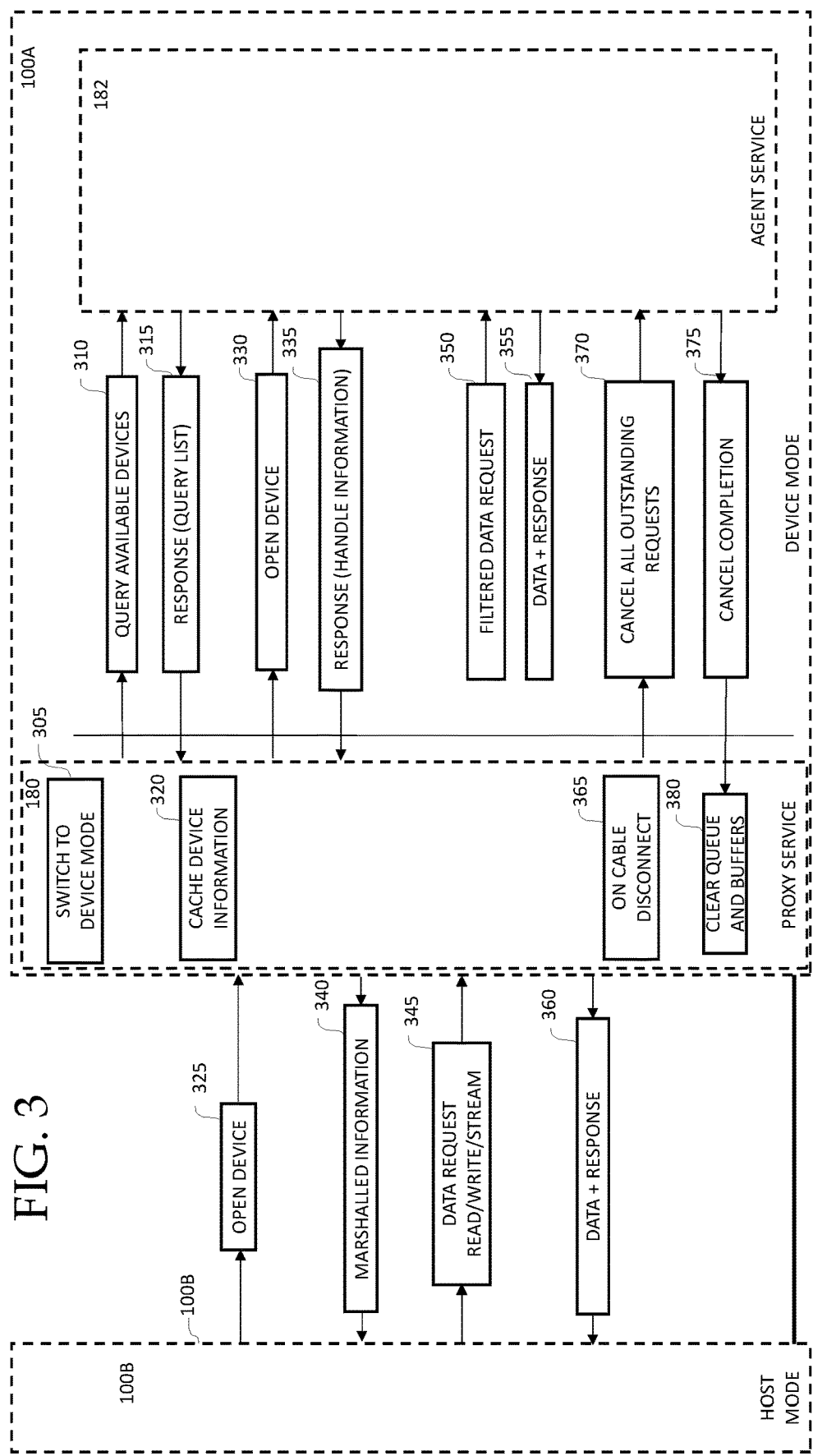
FIG. 3 is a flowgraph depicting communication of commands between a host controller and a device controller, illustrating the reduced overhead incurred for a bulk data request.

Particular embodiments are best understood by reference to FIGS. 1-3, wherein like numbers are used to indicate like and corresponding parts.

Turning to the drawings, FIG. 1 illustrates a block diagram depicting selected elements of an embodiment of a portable information handling system. It is noted that FIG. 1 is not drawn to scale but is a schematic illustration.

As shown in FIG. 1, components of information handling system 100 may include, but are not limited to, a processor subsystem 12, which may comprise one or more processors, and a system bus 14 that communicatively couples various system components to processor subsystem 12 including, for example, a memory subsystem 16, an I/O subsystem 18 including camera 142, local storage resource 20, and a network interface 22. Information handling system 100 may include dual role controller 140 for communicating with other information handling systems 100 (not shown).

Processor subsystem 12 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 16). In the same or alternative embodiments, processor subsystem 12 may interpret and execute program instructions and process data stored remotely (e.g., in a network storage resource).

System bus 14 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 16 may comprise a system, device, or apparatus operable to retain and retrieve program instructions and data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 18 may comprise a system, device, or apparatus generally operable to receive and transmit data to or from or within information handling system 100. I/O subsystem 18 may represent, for example, a variety of communication interfaces, graphics interfaces, video interfaces, user input interfaces, and peripheral interfaces. In various embodiments, I/O subsystem 18 may be used to support various peripheral devices, such as a touch panel, a display adapter, a keyboard, a touch pad, or a camera 142, among other examples. In some implementations, I/O subsystem 18 may support so-called 'plug and play' connectivity to external devices, in which the external devices may be added or removed while information handling system 100 is operating.

Local storage resource 20 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 22 may be a suitable system, apparatus, or device operable to serve as an interface between information handling system 100 and a network (not shown). Network interface 22 may enable information handling system 100 to communicate over a network using a suitable transmission protocol or standard. In some embodiments, network interface 22 may be communicatively coupled via a network to a network storage resource (not shown). A network coupled to network interface 22 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 22 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 22 or various components associated therewith may be implemented using hardware, software, or any combination thereof.

A user may want to connect two portable information handling systems 100 via a USB connection. For example, the user may want to access a device such as internal storage to transfer bulk data using mass storage access or access camera or webcam 142 to transfer videos or receive streaming using, for example, media transport protocol (MTP). Dual role controller 140 allows portable information handling system 100 to operate in a device mode or a host mode to allow two portable information handling systems 100 to transfer data via peer-to-peer USB cables, wherein an application running on portable information handling system 100 triggers dual role controller 140 to switch operation from a device mode to a host mode or vice-versa.

For improved security and compatibility, in many portable information handling systems, hardware isolated applications may be isolated using hypervisors (also referred to as Virtual Machine Managers or VMMs) with a mini/micro-kernel and libraries. For example, Virtualized Application Interface Layer ("VAIL") in Windows Core Operating System ("WCOS") and Windows Defender Application Guard ("WDAG") for Edge browsers are examples of VMMs. For these applications, USB devices are exposed via USB device virtualization (similar to VDI USB device virtualization).

Using these types of systems is problematic. For example, dual role host controller implementation varies across vendors (especially status and command registers), so vendor implementation variations must be addressed during virtualizations.

Furthermore, in VDI sessions, USB device redirection works only when a portable information handling system is operating in the host mode. When the portable information handling system switches to operating in a device mode, the entire device stack is different, which prevents many portable information handling systems from connecting or redirecting the devices to hardware isolated applications or to a VDI session. Similarly, in hardware isolated applications, the operating system in the VDI desktop and the micro-kernel in the hardware isolated application will not have the device mode stack. As such, the device mode commands cannot be transferred to the VDI and hardware isolated applications and the regular USB device redirection cannot be used. In these systems, a virtual host controller performs extensive communications and has many registers, states and commands as compared to high level storage and streaming application commands. Since the virtual host controller is designed to work between the USB hub-driver and the USB-host controller on the same portable information handling system, the system is sensitive to latency, such as during interrupts and isochronous transfers.

To overcome these and other shortcomings, embodiments disclosed herein include a system for supporting a dual role controller 140 in portable information handling system 100.

Referring to FIG. 2, portable information handling system 100A may be configured with information handling system software stack 150 operating in device mode executing dual role controller 140A and applications such as streaming application 152, mass transfer/MTP storage application 154 and USB hub 156. Portable information handling system 100A may be configured with applications 170 executable by dual role controller 140A. Portable information handling system 100A may be configured with isolated software stack 160 executing isolated applications such as file and disk stack 162, storage stack 164 and video stack 166. Hardware isolated applications 170A may refer to an application 170 running inside isolated software stack 160. One or more hardware isolated applications 170A may execute on the VDI/remote hardware application side. Portable information handling system 100A further comprises proxy service 180 and agent service 182. As depicted in FIG. 2, second portable information handling system 100B may have controller 140B operating in a host mode, USB hub 156 and class function drivers 157, with one or more applications 170. For simplicity, second portable information handling system 100B is depicted with applications 170 but may also have a VDI or be configured to execute one or more hardware isolated applications 170A.

Proxy service 180 monitors communications for any dual role controller role change notifications. If portable information handling system 100A is operating in a host mode and proxy service 180 detects a change to operate portable information handling system 100A in a device mode, proxy service 180 queries agent service 182 operating at the VDI desktop and hardware isolated application side via a network (internal or external) to determine the available devices. When agent service 182 returns a list of available devices, proxy service 180 exposes these devices to information handling system software stack 150. In some embodiments, only one device is exposed at a time.

Agent service 182 handles all the commands sent from proxy service 180 and gets data and responses from storage and storage applications using storage stack 164 and audio/visual devices and applications using video stack 166. Streaming application 152 may include software for supporting use of camera 142 operable to record images or videos. For example, VidStream is an application that may be used to stream media, such as videos captured by camera 142 on portable information handling system 100A.

Embodiments disclosed herein allow remote hardware applications and VDI/desktop applications to transfer data via portable information handling system controller 140 without implementing a complex stack. Portable information handling system stack 150 remains operating in a device mode and any VDI or hardware-isolated applications 170A execute on isolated application function stack 160, which remains operating in a host mode. Proxy service 180 and agent service 182 marshal the commands, data and responses dynamically during data transfers. In some embodiments, proxy service 180 and agent service 182 allow remote hardware applications 170A and VDI desktops to have only a USB 3.0 stack as part of a Windows 10X hardware container and VDI OS, with portable information handling system stack 150 operating in the device mode.

High level USB function commands such as device requests and data requests may be received from another portable information handling system 100B and processed by proxy service 180. Proxy service 180 sends device and data requests to agent service 182 and agent service 182 may service a request from proxy service 182 using low level commands.

FIG. 3 depicts a system architecture block diagram of portable information handling system 100A connected to information handling system 100B using cable 12. Cable 12 may be, for example, a USB-C or OTG type cable.

Agent service 182 may execute at a VDI Desktop/application or hardware isolated application 170A side of portable information handling system 100A. Agent service 182 may be configured to receive requests from proxy service 180, translate the request, communicate with a hardware isolated application and communicate a response to proxy service 180. In some embodiments, agent service 182 may translate a high level request such as an MTP request or generic-USB request to a low level request such as a WinUSB/lib-USB request. In some embodiments, agent service 182 may communicate with File Stack (FS) and Disk Stack 162 associated with a storage device in portable information handling system 100A or video stack 164 associated with camera 142, receive a response from FS and Disk Stack 162 or video stack 164 and communicate a response to proxy service 180.

High level functions may be enabled when portable information handling system 100A is operating in a device mode. For example, storage functions such as MTP 154, Webcam functions such as media streaming application 152, or generic-USB functions such as HID and IPOverUSB may be enabled when portable information handling system 100A is operating in a device mode and executing VDI or remote hardware applications 170A.

Referring to FIG. 3, a flowgraph depicting communication of commands between portable information handling system 100A having a dual role controller and a second information handling system connected by a cable illustrates the reduced overhead associated with one embodiment of a system for supporting dual role USB controller 140. FIG. 3 is described in relation to a bulk read request received from second portable information handling system 100B.

At step 305, portable information handling system 100A switches operation to a device mode. In some embodiments, switching to a device mode comprises executing proxy service 180 and agent service 182.

At step 310, proxy service 180 communicates with agent service 182 and agent service 182 queries devices available on portable information handling system 100A. In some embodiments, when portable information handling system 100A switches operation to a device mode, proxy service 180 executing on dual role controller 140 connects to agent service 182 and sends a device request to agent service 182.

At step 315, agent service 182 sends a response to proxy service 180, wherein the response includes a device list. In some embodiments, only one device function (mass storage, media streaming, etc.) may be returned in the device list.

At step 320, information including the device list may be cached in memory on portable information handling system 100A.

At step 325, when portable information handling system 100A is connected to portable information handling system 100B and opened for communication, portable information handling system 100A may communicate information to portable information handling system 100B including a device list of available devices such as internal storage or camera 142.

At step 330, proxy service 180 may send an open device command to agent service 182.

At step 335, when portable information handling system 100A is opened for communication, agent service 182 may send a response including handle information to proxy service 180.

At step 340, proxy service 180 sends the handle information to dual role controller 140A which marshals the information to portable information handling system 100B.

At step 345, dual role controller 140A may receive a data request (e.g. read, write, or stream) from portable information handling system 100B.

At step 350, proxy service 180 may receive the data request from portable information handling system 100B and communicate a data request to agent service 182.

At step 355, agent service 182 may retrieve data from storage stack 164 or video stack 166 in second software stack 160 and communicate the data and the response to proxy service 180.

At step 360, proxy service 180 may receive the data and the response from agent service 182 and communicates a response to portable information handling system 100B over cable 12.

At step 365, dual role controller 140A may determine cable 12 is disconnected, terminating communication between portable information handling system 100A and portable information handling system 100B.

At step 370, dual role controller 140A may communicate a request to cancel any outstanding requests. Proxy service 180 may receive the request from dual role controller 140A and communicate a request to agent service 182.

At step 375, agent service 182 may communicate information indicating completion of commands necessary to cancel any remaining requests. Proxy service 180 may receive the information from agent service 182 and communicate a signal to dual role controller 140A, wherein dual role controller 140A may receive the signal and execute steps to clean a queue and any buffers in memory.

Advantageously, using embodiments disclosed herein, all requests from second information handling system 100B may be serviced using existing high level storage commands (e.g., fread, fwrite, fopen, fclose, fflush, etc.). Any required USB commands (e.g., USB pipe reset, etc.) may be serviced using lower level WinUSB/lib-USB commands.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for supporting a dual role controller in a portable information handling system, the method comprising:
   storing, in a memory medium associated with the dual role controller, a proxy service and an agent service;
   executing the proxy service to monitor communications associated with the dual role controller to determine if the portable information handling system is executing instructions to operate in a device mode;
   in response to determining the portable information handling system is executing the instructions to operate in the device mode:
      executing the agent service to communicate with a software stack associated with a host mode; and
      communicating, by the proxy service, with the agent service and a software stack associated with the device mode.

2. The method of claim 1, wherein the proxy service is configured for communicating a request from a media transport protocol (MTP) or a mass storage application and the agent service is configured for translating the request into a set of application specific requests.

3. The method of claim 2, wherein the agent service is configured for translating the request into the set of application specific requests before communicating with a Virtual Desktop Interface (VDI) or an isolated application.

4. The method of claim 3, wherein communicating with the Virtual Desktop Interface (VDI) or the isolated application comprises:
   communicating, from the proxy service to the agent service, a command to open a device;
   communicating, from the agent service to the proxy service, a device request response comprising handle information associated with the device;
   sending, by the proxy service to a device controller, marshalled handle information associated with the device,
   receiving, by the proxy service from the device controller, a data request associated with the device;
   communicating, by the proxy service, the data request to the agent service;
   communicating a data response from the agent service to the proxy service; and
   sending, from the proxy service to the device controller, the data response to the data request.

5. The method of claim 1, wherein executing the proxy service to monitor the communications associated with the dual role controller comprises determining when a cable is connected to the portable information handling system and connected to a second information handling system, the second information handling system operating in the host mode.

6. The method of claim 5, wherein:
   in response to detecting the cable is connected to the portable information handling system and the second information handling system, the dual role controller switching to operating in the device mode;
   in response to the portable information handling system switching to operating in the device mode, the proxy service communicating a device query to the agent service; and
   in response to receiving the device query, the agent service communicating a device list of available devices to the proxy service; and in response to receiving the device list, the proxy service caching the device list to the software stack associated with the device mode accessible by the dual role controller.

7. The method of claim 6, wherein caching the device list to the software stack associated with the device mode comprises fabricating one or more USB device descriptors.

8. The method of claim 7, wherein the one or more USB device descriptors comprises at least one of a device descriptor, a configuration descriptor, an interface descriptor and an endpoint descriptor.

9. The method of claim 6, wherein:
in response to detecting the cable is disconnected, communicating, from the proxy service to the agent service a cancel command to cancel any outstanding data requests; and
in response to receiving the cancel command, communicating from the agent service to the proxy service a cancel completion response when all the outstanding data requests are canceled.

10. A system for supporting a dual role controller in a portable information handling system, the system comprising:
a memory medium storing a proxy service and an agent service, wherein:
the proxy service is configured to:
monitor communications to determine when the dual role controller is changing from operating in a host mode to operating in a device mode;
receive one of a device request or a data request from a second information handling system coupled to the portable information handling system;
communicate the data request to the agent service; and
send a response to the second information handling system, the response comprising one of a data response to the data request or device information; and
the agent service is configured to:
translate the data request received from the proxy service into one or more application specific requests corresponding to a hardware isolated application or a virtual desktop interface (VDI) application;
send, to the proxy service, one of a device response or the data response.

11. The system of claim 10, wherein the proxy service is configured to:
send the device request to the agent service to open an application executing on the portable information handling system;
receive the device response from the agent service, the device response including handle information for the application executing on the portable information handling system.

12. The system of claim 10, wherein the proxy service is configured to:
send a bulk data request to the agent service; and
receive a bulk data response from the agent service.

13. The system of claim 10, wherein:
the proxy service is configured to send the device request to the agent service; and
the agent service is configured to send the device response to the proxy service, the device response comprising the handle information for the application executing on the portable information handling system.

14. The system of claim 10, wherein the proxy service is configured to communicate a request from a mass transport protocol (MTP) or mass storage application and the agent service is configured to translate the request into a set of application specific requests.

15. The system of claim 14, wherein the agent service is configured to translate the request into the one or more application specific requests before communicating with the Virtual Desktop Interface (VDI) or the hardware isolated application.

16. The system of claim 10, wherein the proxy service is configured to monitor the communications to determine when a cable is connected to the portable information handling system to determine when the dual role controller is changing from operating in the host mode to operating in the device mode.

17. The system of claim 10, wherein the proxy service is configured to:
communicate a command to open an application associated with a device to the agent service;
receive from the agent service a response comprising the handle information for the application associated with the device; and
send marshalled handle information for the application associated with the device to the second information handling system.

18. The system of claim 17, wherein the proxy service is configured to:
receive the data request for the application associated with the device;
communicate the data request to the agent service;
receive the data response from the agent service; and
send the data response to the second information handling system.

19. The system of claim 10, wherein the proxy service is configured to cache a device list to the function stack.

20. The system of claim 19, wherein the proxy service is configured to generate one or more USB device descriptors, each USB device descriptor comprising at least one of a device descriptor, a configuration descriptor, an interface descriptor and an endpoint descriptor.

* * * * *